June 15, 1965  J. A. McGRORY  3,189,466
ANTI-STICKING COMPOSITION FOR FRYING AND BAKING
Filed Jan. 2, 1962
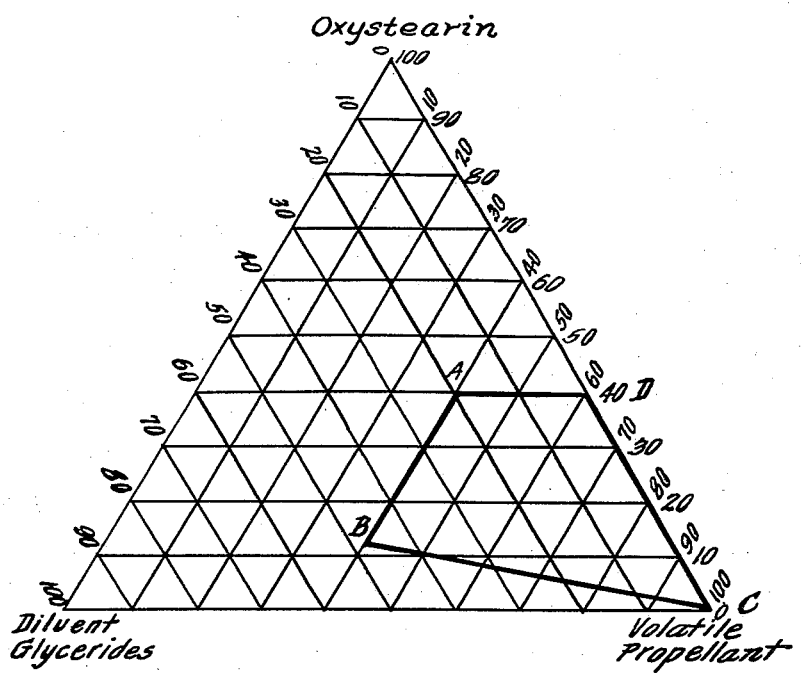
INVENTOR
James A. McGrory,
BY
ATTORNEY

United States Patent Office 3,189,466
Patented June 15, 1965

3,189,466
ANTI-STICKING COMPOSITION FOR FRYING AND BAKING
James A. McGrory, Cincinnati, Ohio, assignor to The Procter & Gamble Company, Cincinnati, Ohio, a corporation of Ohio
Filed Jan. 2, 1962, Ser. No. 163,706
8 Claims. (Cl. 99—123)

This invention relates to compositions which prevent food from sticking to the surface of the frying pan or other utensils used during cooking. More particularly, this invention relates to the discovery that certain novel compositions which contain a hydrogenated and oxygenated glyceride oil have outstanding anti-sticking properties useful for frying, baking, and other cooking purposes.

One of the essential steps in the frying and baking of foods is the greasing of the cooking surface. A common practice is to coat the cooking vessel with an oily material such as a vegetable oil or an animal fat. It is known that such materials function as efficient heat-transfer media between the source of the heat and the food to be cooked.

Despite their effectiveness as heat transfer media, the oils and fats normally employed for frying and baking have several disadvantages. It is well known that much oil or fatty material is absorbed by the food during the cooking process. Moreover, at the temperatures generally required for cooking, the oil and the food are subject to oxidative deterioration. The combined action of this deterioration and absorption of oil tends to cause the food to stick to the frying pan or other utensils used during cooking. The oxidative deterioration and loss of surface grease frequently produces smoking and causes undesirable blackened areas to appear on the surface of the food as well as on the cooking surfaces. In addition, the absorption of substantial quantities of oil by the food is unsatisfactory from the standpoint of low-fat dieting.

Accordingly, it is an object of this invention to provide a cooking composition which substantially prevents food from sticking on utensils during frying, baking, and other cooking preparations.

It is another object to provide a method of applying a very thin film of an anti-sticking material between the food and the cooking utensils so that, in effect, a substantially greaseless frying or baking may be carried out which is particularly suitable for people on a low-fat diet.

It is a further object to provide a cooking surface that remains substantially free of carbonized material during the cooking process to allow the preparation of non-blackened fried and baked food products and to facilitate cleaning of the cooking implements.

It is still another object to provide a cooking grease from edible glyceride oils and fats.

Still a further object is to modify the physical properties of edible glyceride oils to adapt them to anti-sticking frying and baking uses.

With these objects in view, together with such other objects and advantages as may subsequently appear, the invention is carried into effect by the employment of certain substances and the treatment thereof as hereinafter described and particularly defined in the appended claims.

In the accompanying drawing a trilinear diagram is shown in which the area within the lines ABCDA represents the preferred anti-sticking composition in combination with a volatile propellant. The ingredients are shown in percent by weight.

The present invention is based on the discovery that certain fatty glyceride compositions containing substantial amounts of a hydrogenated and oxygenated glyceride oil have outstanding anti-sticking properties and can be applied to cooking utensils in the form of a very thin film either directly or by means of aerosol spraying from a pressurized vessel which contains, additionally, a volatile propellant.

In accordance with the broad aspects of the present invention it is essential that the anti-sticking composition contain a base oil that is both hydrogenated and oxygenated. Moreover, it is essential that the base oil is first very highly hydrogenated and then slowly oxygenated by heating in a stream of air. The base oil which is processed in the said manner can then be used directly or can be combined with certain diluent fats and oils to prepare anti-sticking compositions which are useful for frying, baking, and other cooking purposes.

The base oil used is selected from the group of edible glycerides of vegetable, animal, marine, or synthetic origin having fatty chain lengths of about 12 to about 22 carbon atoms. It has been found preferable to use an oil that has a high proportion of fatty chain lengths of about 18 carbon atoms such, for example, as cottonseed oil or soybean oil, although other edible vegetable oils such as corn oil, coconut oil, palm oil, peanut oil, sesame seed oil, sunflower seed oil, and rapeseed oil, and animal fats such as lard and tallow, and marine oils such as whale oil, sardine oil and menhaden oil are also usable. Suitable synthetic oils include glycerides containing one or two short-chain fatty acids, or oils prepared by random or low-temperature interesterification.

Hydrogenation of the base oils can be carried out by any of the conventional methods and generally consists of a batch process whereby the oil is contacted with hydrogen in the presence of a nickel catalyst. The addition of hydrogen to the triglyceride molecule converts the unsaturated fatty acid moiety into the corresponding saturated fatty acid. Hydrogenation should be carried out until the hardened oil has an iodine value of less than about 25, although it has been found particularly advantageous to hydrogenate to an iodine value of less than 8 and preferably about 6.

After it is hydrogenated, the base oil is then subjected to an oxidation reaction in which it is simultaneously treated with air and heat. The heating is conducted preferably at temperatures in the range of about 200°–250° C. and the air is blown through the oil at a rate of about 15–25 cubic feet per minute per 1000 pounds of oil for a period of about 5 to 8 hours, preferably until the treated oil attains a butyro refractive index of about 60±1 at 48° C.

While it is neither essential to use a treated oil having a refractive index as set forth above, nor necessary to conduct the entire oxidation within the aforesaid ranges, it has been found that the anti-sticking activity of the treated oil is optimized if a considerable portion of the oxidizing reaction is conducted with the heretofore described amount of heating and air blowing. Thus, the final oxidized oil will not be materially deprived of its anti-sticking activity if a portion of the oxidation reaction is conducted, for example, at temperatures below 200° C. or if some air is blown through the oil, for example, at a rate above 25 cubic feet per minute per 1000 pounds of oil. Moreover, the refractive index of the final oil may vary somewhat from the described level depending upon, for example, the length of the hydrocarbon chain in the base oil or on the degree of hydrogenation or saturation of the said oil.

At the conclusion of the aforesaid oxidizing step the treated oil is cooled. It can then be blended into a diluent oil or fat to prepare the anti-sticking compositions of this invention.

The oil that has been hydrogenated and oxygenated in the aforesaid described manner is hereinafter referred to as "oxystearin" because it is a hardened "stearin" type substance with oxygen introduced into the molecule. The suffix "-stearin" (as used herein) embraces not only tristearin, but also mixed glycerides containing palmitic, stearic, arachidic, and other saturated fatty acids which comprise the bulk of the solid glycerides referred to in the trade as stearins. The said oxystearin generally has a dark-brownish solid consistency at room temperature. However, it is to be understood that for the purposes of this invention the oxystearin is not intended to be limited by any specific process for its preparation.

It has been found that a composition which contains from about 20% to about 95% and preferably from about 20% to about 40% by weight of oxystearin blended with a complement of a diluent oil or fat displays remarkable anti-sticking properties during frying, baking, and other cooking processes, although the oxystearin may be applied directly to the cooking utensil without such additional dilution. The diluent can be derived from any edible vegetable oil such as cottonseed oil, soybean oil, coconut oil, palm oil, corn oil, or an edible animal fat such as lard or tallow, or a marine oil such as whale, menhaden, or sardine oil, or synthetic oils such as those prepared by random or low-temperature interesterification or glycerides containing one or two short-chain fatty acids, several of which may be combined in various proportions. The diluent facilitates the application of the oxystearin in the form of a thin film on the cooking utensils.

Various minor ingredients such as antioxidants and crystallization inhibitors can be included in the diluent oil without destroying the primary benefits of the anti-sticking agent.

Although the anti-sticking compositions herein defined can be applied to the cooking utensils with a brush or by other means such as a cloth or an absorbent paper towel, they are preferably applied in the form of a fine spray under pressure. In this way, the surface may be rapidly and uniformly covered with a very thin film. The thin film is necessary not only from the standpoint of low-fat dieting but also serves to conceal the heretofore disclosed brownish color of the oxystearin. In order to coat the cooking surface with such a film it is preferable that the composition be admixed with a suitable aerosol propellant so that it can be expelled from a pressurized can or other vessel. Any propellant which is highly volatile at ordinary temperatures and pressures can be used, but it is preferable that the propellant be non-toxic, odorless, tasteless and stable.

For the purpose of this invention, various fluoro-halo derivatives of low molecular weight hydrocarbons such, for example, as trichloromonofluoromethane, dichlorodifluoromethane and mixtures thereof have been found to be satisfactory propellants. Other fluorocarbons such, for example, as octafluorocyclobutane and compressed gases such, for example, as nitrous oxide, carbon dioxide, nitrogen, and other propellants which are highly volatile at ordinary temperatures and pressures, either alone or in combination with the aforesaid substances can be used with comparable results.

The mixture to be sprayed can contain from about 0.1% to about 40% by weight of the aforesaid oxystearin dissolved in the volatile propellant. The aforesaid oxystearin-containing glyceride blends are also preferably dissolved in the volatile propellant so that the ingredients of the pressurized composition are distributed in the following proportions:

| | Percent by weight |
|---|---|
| Oxystearin | 0.1–40 |
| Diluent glycerides | 0.005–48 |
| Volatile propellant | 40–99.895 |

The said preferred aerosol composition lies within the lines ABCDA of the trilinear diagram of the drawing.

The following examples are illustrative of the present invention, but it will be understood that the invention is not limited thereto.

EXAMPLE 1

The following Table I records the results obtained with several substances which were used as anti-sticking agents during the frying of eggs. The substance to be used in each instance was initially applied in excess to the inner surface of a slightly warm electric frying pan. As the temperature of the pan increased somewhat, the excess oily material was poured out and blotted off with an absorbent paper towel so that barely a thin film remained on the surface of the pan. Eggs were then fried in the pan at a temperature of 320° F. and their tendency to stick to the surface was observed.

*Table I*

| Substance Tested | Frying Acceptability | |
|---|---|---|
| | Sticking Effect | Other Frying Effects |
| Cottonseed oil | Appreciable sticking | None. |
| Hydrogenated vegetable oil shortening [1] | do | Do. |
| Oxystearin | No sticking | Do. |
| 40% oxystearin and 60% cottonseed oil | do | Do. |
| 20% oxystearin and 80% cottonseed oil | do | Do. |

[1] Consisting primarily of hydrogenated soybean oil (I.V. 70–75) and minor amounts of hardstock and monoglyceride emulsifiers.

The oxystearin in this example was prepared from hydrogenated cottonseed oil having an iodine value of about 6 to 8 and a butyro refractive index of about 39±1 at 48° C. The said hydrogenated oil was bodied with heat at about 225°–250° C. and air blown at the rate of about 20 cubic feet per minute per 1000 pounds of oil until the final product met the following specifications:

| | |
|---|---|
| Acid number | 14. |
| Iodine value | 14. |
| Saponification number | 225–240. |
| Hydroxyl value | 30–45. |
| Unsaponifiable matter | 0.8%. |
| Butyro refractive index | 60±1 at 48° C. |
| Molecular weight | 925–975. |

The oxystearin was a dark chocolate-brown colored material having a greasy-wax consistency at room temperature and a texture similar to refrigerated butter.

When a composition consisting of 20% by weight of oxystearin prepared from rapeseed base oil hydrogenated to an iodine value of about 8 and blended with 80% by weight of refined rapeseed diluent oil is substituted for the blend of oxystearin and cottonseed oil shown above, substantially the same results are obtained. However, when the proportion of oxystearin in the glyceride oil blend is reduced to less than about 20%, the anti-sticking effects are not pronounced, and a heavier application of a more dilute oxystearin-containing oily material results in a film that is too thick for substantially greaseless low-caloric frying purposes.

EXAMPLE 2

The following Table II records the results obtained with several substances which were used as anti-sticking agents during the cooking of oatmeal. The substance to be used in each instance was applied in the form of a thin film to the inner surface of a standard commercial enameled pan. The pan was provided with water (in a 2:1 proportion of water to oats) and a little salt, and brought to a boil. Quick Oats were then stirred in and cooked for one minute. The heat was removed and the pan was covered and allowed to rest for five minutes. Serving portions of oatmeal were removed and the pan was allowed to cool for a normal eating interval. Then the pans were cleaned and a judgment was made of the sticking effect and of the ease or difficulty of cleaning the inner surface.

Table II

| Substance Tested | Sticking and Cleaning Effects |
|---|---|
| Plain oatmeal pan with no coating | Severe sticking; difficult to clean pan. |
| Hydrogenated vegetable oil shortening [1] | Appreciable sticking; difficult to clean pan. |
| Oxystearin [2] | No sticking; easy to clean pan. |

[1] Consisting primarily of hydrogenated soybean oil (I.V. 70-75) and minor amounts of hardstock and monoglyceride emulsifiers.
[2] Prepared as in Example 1 above.

EXAMPLE 3

The following Table III records the results obtained with several substances which were used as anti-sticking agents during the baking of blueberry muffins. The substance to be used in each instance was applied in the form of a thin film to the inner surface of standard muffin pans. A batter was prepared from a standard commercial blueberry muffin mix and placed in the pans to a ½-cup depth. The muffins were baked for 20–25 minutes in an oven heated to 400° F. The muffins were allowed to cool 10–15 minutes and then removed from the pans. Their tendency to stick to the surface of the pan and the ease or difficulty of removal therefrom was observed.

Table III

| Substance Tested | Sticking Effects |
|---|---|
| Plain muffin tins with no coating | Severe sticking. |
| Cottonseed oil | Appreciable sticking. |
| Hydrogenated vegetable oil shortening [1] | Do. |
| Oxystearin [2] | No sticking. |
| 40% oxystearin and 60% cottonseed oil | Virtually no sticking. |
| 20% oxystearin and 80% cottonseed oil | Do. |

[1] Consisting primarily of hydrogenated soybean oil (I.V. 70-75) and minor amounts of hardstock and monoglyceride emulsifiers.
[2] Prepared as in Example 1 above.

When a composition consisting of 95% by weight of oxystearin prepared from coconut base oil hydrogenated to an iodine value of about 8 and blended with 5% by weight of refined coconut diluent oil is substituted for the blend of oxystearin and cottonseed oil shown above, substantially the same results are obtained. However, as the proportion of oxystearin in the glyceride oil blends is increased to levels greater than about 40% by weight, it becomes more difficult to apply the anti-sticking material to the surface of the pan in the form of a very thin film. Thus, it is preferable to use not more than about 40% oxystearin in the oil blend.

EXAMPLE 4

The oxystearin prepared in accordance with Example 1 was mixed with a volatile propellant, which consisted of a 35:65 mixture of dichlorodifluoromethane and trichloromonofluoromethane, and packed under pressure in an aerosol container. The final pressurized composition was then sprayed onto the inner surface of a frying pan for about 2–4 seconds in the form of a fine spray. The following Table IV records the anti-sticking effects observed when eggs were fried in the coated pan at a temperature of about 320° F.

Table IV

| Composition Tested | Frying Effects |
|---|---|
| 30% oxystearin and 70% propellant | No sticking; even distribution of a very thin film. |
| 60% oxystearin and 40% propellant | Moderate sticking; uneven distribution of an oily film (streaming effect). |

When an aerosol composition consisting of 40% by weight of oxystearin and 60% by weight of propellant is substituted for the 30:70 mixture shown above, substantially the same results are obtained. However, when the proportion of oxystearin is increased to greater than about 40% by weight, dispersion in the propellant becomes exceedingly difficult and undesirable streaming effects are produced during the aerosol spraying.

EXAMPLE 5

20 parts by weight of oxystearin, prepared in accordance with Example 1, above, were thoroughly blended with 80 parts by weight of cottonseed oil. This blend was then mixed with a volatile propellant, which consisted of a 35:65 mixture of dichlorodifluoromethane and trichloromonofluoromethane, and packed under pressure in an aerosol container. The final pressurized composition was then sprayed onto the inner surface of a frying pan in the form of a fine spray. The following Table V records the anti-sticking effects observed with various proportions of propellant and the 20:80 blend of oxystearin and cottonseed oil when sprayed for different lengths of time onto a frying pan in which eggs were then fried at temperatures of about 320° F.

Table V

| Composition Tested | Spraying Time, seconds | Sticking Effects |
|---|---|---|
| 0.1% oil blend and 99.9% propellant | 5 | Severe sticking. |
| Do | 10 | Appreciable sticking. |
| Do | 20 | Do. |
| Do | 60 | No sticking. |
| 0.5% oil blend and 99.5% propellant | 5 | Appreciable sticking. |
| Do | 10 | Do. |
| Do | 20 | No sticking. |
| Do | 60 | Do. |
| 30% oil blend and 70% propellant | 2 | Do. |
| Do | 8 | Do. |
| 60% oil blend and 40% propellant | 2 | Do. |
| Do | 8 | Do. |

For most frying purposes it is desirable to spray the aerosol composition onto a standard size home frying pan in less than about 20 seconds and preferably in several seconds. A longer spraying period would tend to deplete the contents of the aerosol container too rapidly. It is also important to prepare the anti-sticking composition in a manner so that a spraying time of more than a few seconds will not produce too thick of a film of oily material on the frying pan. A thick film would be unsatisfactory for purposes of low-fat dieting and would tend to show the heretofore disclosed brownish color of the oxystearin. It has been found that the aforesaid objectives can be attained with outstanding satisfaction with an aerosol composition which lies within the lines ABCDA of the trilinear diagram of the drawing.

Although the compositions of this invention are eminently suitable for anti-sticking purposes during various cooking processes, they can be used in other applications where an oleaginous coating is desired, particularly where resistance to oxidative deterioration is important.

What is claimed is:
1. The method of improving a cooking utensil for frying and baking which comprises coating the cooking surface of the said utensil with a thin film of an anti-sticking composition consisting essentially of from about 20% to about 95%, by weight, oxystearin and from about 5% to about 80%, by weight, diluent glyceride.
2. The method of improving a cooking utensil for frying and baking which comprises coating the cooking surface of the said utensil with a thin film of an anti-sticking composition consisting essentially of from about 20% to about 40%, by weight, oxystearin and from about 60% to about 80%, by weight, diluent glyceride.
3. The method of improving a cooking utensil for frying and baking which comprises coating the cooking surface of the said utensil by spraying said surface with an anti-sticking composition consisting essentially of from about

0.1% to about 40%, by weight, oxystearin thoroughly mixed with from about 60% to about 99.9%, by weight, non-toxic volatile propellant.

4. The method of improving a cooking utensil for frying and baking which comprises coating the cooking surface of the said utensil by spraying said surface with an anti-sticking composition consisting essentially of from about 20% to about 95%, by weight, oxystearin and from about 5% to about 80%, by weight, diluent glyceride, said anti-sticking composition being thoroughly mixed with a non-toxic volatile propellant, and said ingredients being distributed in proportions within the lines ABCDA of the trilinear diagram of the drawing.

5. A cooking composition for use as an anti-sticking agent on cooking utensils consisting essentially of from about 20% to about 95%, by weight, oxystearin and from about 5% to about 80%, by weight, diluent glyceride.

6. A cooking composition for use as an anti-sticking agent on cooking utensils consisting essentially of from about 20% to about 40%, by weight, oxystearin and from about 60% to about 80%, by weight, diluent glyceride.

7. A cooking composition adapted to be dispensed from a pressurized container for use as an anti-sticking agent consisting essentially of from about 0.1% to about 40%, by weight, oxystearin thoroughly mixed with from about 60% to about 99.9%, by weight, non-toxic volatile propellant.

8. A cooking composition adapted to be dispensed from a pressurized container for use as an anti-sticking agent consisting essentially of from about 20% to about 95%, by weight, oxystearin and from about 5% to about 80%, by weight, diluent glyceride, said cooking composition being thoroughly mixed with a non-toxic volatile propellant, and said ingredients being distributed in proportions within the lines ABCDA of the trilinear diagram of the drawing.

References Cited by the Examiner
UNITED STATES PATENTS

| | | | |
|---|---|---|---|
| 1,570,529 | 1/26 | Schou | 99—122 |
| 2,210,043 | 8/40 | Scherr | 99—123 |
| 2,309,488 | 1/43 | Wasserman | 99—123 |
| 2,463,870 | 3/49 | Hansen | 99—118 |
| 2,470,593 | 5/49 | Webb et al. | 220—64 |
| 2,687,177 | 7/54 | Kennedy | 220—64 |
| 2,849,323 | 8/58 | Young | 99—189 |
| 2,865,760 | 12/58 | Bremer | 99—123 |
| 3,011,896 | 12/61 | Eber et al. | 99—118 |

OTHER REFERENCES

Food Engineering, May 1958, pp. 64–67.

A. LOUIS MONACELL, *Primary Examiner*.

TOBIAS E. LEVOW, ABRAHAM H. WINKELSTEIN,
*Examiners*.